United States Patent
Engelken (10) Patent No.: US 10,914,286 B2
(45) Date of Patent: Feb. 9, 2021

(54) METHOD FOR DETERMINING AN EQUIVALENT WIND VELOCITY

(71) Applicant: Wobben Properties GmbH, Aurich (DE)

(72) Inventor: Sönke Engelken, Bremen (DE)

(73) Assignee: Wobben Properties GmbH, Aurich (DE)

( * ) Notice: Subject to any disclaimer, the term of this patent is extended or adjusted under 35 U.S.C. 154(b) by 368 days.

(21) Appl. No.: 16/079,310

(22) PCT Filed: Feb. 24, 2017

(86) PCT No.: PCT/EP2017/054265
§ 371 (c)(1),
(2) Date: Aug. 23, 2018

(87) PCT Pub. No.: WO2017/144631
PCT Pub. Date: Aug. 31, 2017

(65) Prior Publication Data
US 2019/0048853 A1    Feb. 14, 2019

(30) Foreign Application Priority Data
Feb. 24, 2016 (DE) .................. 10 2016 103 254

(51) Int. Cl.
*F03D 7/02* (2006.01)
*F03D 17/00* (2016.01)

(52) U.S. Cl.
CPC ........... *F03D 7/0284* (2013.01); *F03D 17/00* (2016.05); *F05B 2260/821* (2013.01);
(Continued)

(58) Field of Classification Search
CPC .. F03D 7/0284; F03D 17/00; F05B 2260/821; F05B 2270/32; F05B 2270/327;
(Continued)

(56) References Cited

U.S. PATENT DOCUMENTS 4,357,542 A * 11/1982 Kirschbaum ........... F03D 9/255
290/44
7,982,327 B2    7/2011 Arinaga et al.
(Continued)

FOREIGN PATENT DOCUMENTS

CN    103410659 A    11/2013
CN    104603456 A    5/2015
(Continued)

OTHER PUBLICATIONS

Johnson et al., "Control of Variable-Speed Wind Turbines," *IEEE Control Systems Magazine* 26(3):70-81, Jun. 2006.
(Continued)

*Primary Examiner* — Pedro J Cuevas
(74) *Attorney, Agent, or Firm* — Seed IP Law Group LLP (57) ABSTRACT

A method for determining an equivalent wind speed of a rotor blade plane of a wind power installation is provided. The wind power installation has a rotor with rotor blades that have adjustable blade angle. The method includes determining an electric internal power available in the wind power installation depending on a captured electric power and a captured rotational speed of the rotor. The method includes determining the equivalent wind speed depending on the determined available internal power and the captured rotational speed.

19 Claims, 3 Drawing Sheets

(52) U.S. Cl.
CPC ..... *F05B 2270/32* (2013.01); *F05B 2270/327* (2013.01); *F05B 2270/328* (2013.01); *F05B 2270/335* (2013.01); *F05B 2270/337* (2013.01); *Y02E 10/72* (2013.01)

(58) Field of Classification Search
CPC .......... F05B 2270/328; F05B 2270/335; F05B 2270/337; Y02E 10/72
USPC .............................. 290/44, 55; 700/287, 291
See application file for complete search history.

(56) References Cited

U.S. PATENT DOCUMENTS

| | | | | |
|---|---|---|---|---|
| 8,183,707 | B2* | 5/2012 | Siebers | F03D 7/026 290/53 |
| 8,283,798 | B2* | 10/2012 | Siebers | F03D 7/026 290/44 |
| 8,796,873 | B2* | 8/2014 | Zhu | H02P 9/007 290/44 |
| 9,062,653 | B2* | 6/2015 | Brath | F03D 7/042 |
| 9,404,474 | B2* | 8/2016 | Watanabe | F03D 3/005 |
| 9,551,322 | B2* | 1/2017 | Ambekar | F03D 7/045 |
| 10,584,679 | B2* | 3/2020 | Engelken | F03D 9/255 |
| 2003/0165379 | A1 | 9/2003 | Wobben | |
| 2009/0108582 | A1* | 4/2009 | Seibers | F03D 7/026 290/44 |
| 2011/0204635 | A1 | 8/2011 | Miller | |
| 2012/0211985 | A1* | 8/2012 | Siebers | F03D 7/043 290/44 |
| 2013/0026759 | A1 | 1/2013 | Krueger et al. | |
| 2013/0028742 | A1* | 1/2013 | Watanabe | F03D 3/005 416/219 R |
| 2013/0214535 | A1* | 8/2013 | Brath | F03D 7/042 290/44 |
| 2013/0270826 | A1* | 10/2013 | Zhu | F03D 9/255 290/44 |
| 2014/0103656 | A1* | 4/2014 | Azegami | F03D 9/255 290/44 |
| 2014/0336833 | A1* | 11/2014 | Marinopoulos | G01W 1/10 700/291 |
| 2015/0005966 | A1* | 1/2015 | Gerber | F03D 7/02 700/287 |
| 2015/0152847 | A1* | 6/2015 | Guadayol Roig | F03D 9/257 290/44 |
| 2015/0226185 | A1 | 8/2015 | Beekmann | |
| 2015/0308416 | A1* | 10/2015 | Ambekar | F03D 17/00 700/287 |
| 2017/0284375 | A1* | 10/2017 | Nielsen | G01P 13/02 |
| 2017/0285066 | A1* | 10/2017 | Esbensen | F03D 7/0204 |
| 2017/0321660 | A1* | 11/2017 | Atzler | F03D 7/0224 |
| 2018/0291877 | A1* | 10/2018 | Engelken | F03D 7/0276 |

FOREIGN PATENT DOCUMENTS

| | | |
|---|---|---|
| CN | 105587474 A | 5/2016 |
| DE | 10022129 C2 | 4/2002 |
| DE | 102010014165 A1 | 10/2011 |
| JP | 2004040949 A | 2/2004 |
| JP | 2005083308 A | 3/2005 |
| JP | 2005240725 A | 9/2005 |
| JP | 2015002597 A | 1/2015 |
| KR | 20110028256 A | 3/2011 |

OTHER PUBLICATIONS

Ortega et al., "A Globally Convergent Wind Speed Estimator for Windmill Systems," *2011 50th IEEE Conference on Decision and Control and European Control Conference*, Dec. 12-15, 2011, pp. 6079-6084.

Soltani et al., "Estimation of Rotor Effective Wind Speed: A Comparison," *IEEE Transactions on Control Systems Technology* 21(4):1155-1167, Jul. 2013.

Verrelli et al., "On-Line Identification of Winding Resistances and Load Torque in Induction Machines," *IEEE Transactions on Control Systems Technology* 22(4):1629-1637, Jul. 2014.

* cited by examiner

METHOD FOR DETERMINING AN EQUIVALENT WIND VELOCITY

TECHNICAL FIELD

The present invention relates to a method for determining an equivalent wind speed of a rotor blade plane of a wind power installation. Moreover, the present invention relates to a wind power installation, configured to capture an equivalent wind speed of a rotor blade plane, and it relates to a wind farm.

Description of the Related Art

Wind power installations are known and have commonly one, usually a plurality of rotor blades, which rotate about a rotor axis and pass over a rotor area, i.e., a circular area, in the process. Since a wind power installation produces energy, and ultimately electric current, from the wind, the wind, and hence the wind speed thereof, is of great importance to the wind power installation.

During normal, regular operation, a wind power installation can make do without capturing the wind speed, for example by virtue of setting a power, for example depending on a predetermined rotational speed/power characteristic, depending on the rotor rotational speed of the aerodynamic rotor having the rotor blades.

However, there now are increasingly situations in which knowledge about a wind speed is required, or at least may be helpful. This includes a situation in which the wind power installation needs to be curtailed in terms of its power, for example, for supporting the electric power grid. Various reasons may be present to this end, such as, e.g., the need to provide regulated power for frequency support in an electric power grid. Thus, in this case, the wind power installation supplies less power or energy into the electric power grid than would be possible on account of the prevalent wind conditions. Often, a remuneration claim arises in such cases about the power that could have been fed into the electric power grid, which also can be simply referred to as grid, but was not allowed to be fed on account of the aforementioned reduction. In order to be able to correctly quantify this remuneration claim, how much wind power actually would be present is of interest. In addition to calculating the remuneration, a precise quantification of the power reduction, particularly when reducing the fed power for providing balancing power, may be a precondition for the approval of a wind power installation or a wind farm for providing this service.

Until now, for reasons of simplicity, the last value of the feed, which was still fed without a reduction, served as a basis for the calculation of the remuneration on account of a curtailment of the wind power installation. However, depending on the duration of the interval during which a reduction has to be carried out, this is an inaccurate or even useless basis. An improved option in comparison therewith consists of measuring the wind speed, for example using a nacelle anemometer, which is usually present, in order to calculate how much power could have been fed therefrom with knowledge of the properties of the wind power installation. A problem here is that such a wind measurement is comparatively inaccurate. This inaccuracy can be significant, depending on the wind speed and also on the gustiness of the wind. What is more, the wind speed is not constant over the rotor blade plane. The values of the wind speed can also change, in particular with height.

Such deviations of the wind speed or deviations of an equivalent wind speed, which namely can be assigned, in particular, to a corresponding power production or possible power production of the relevant wind power installation, are known, at least on their merits. These inaccuracies also have corresponding effects on a power determination that is based on these inaccurate values. Within certain limits, it may be possible to compensate such effects, e.g., by correction values such as correction factors, for example. However, such corrections then are based on empirical values and said corrections consequently can only compensate systemic shortcomings of the wind speed capture to a restricted extent.

As a result, it consequently remains difficult to determine with good accuracy such a producible power that would be producible without reducing the operation of the installation. Particularly in the case of a significant curtailment, such a power determination is quite inaccurate; however, it would be required to be particularly accurate precisely in such a case because correspondingly high remuneration may be calculated on account of the significant curtailment.

The German Patent and Trade Mark Office has searched the following prior art in the priority application relating to the present application: US 2011/0204635 A1.

BRIEF SUMMARY

Disclosed herein are methods for determining a possible, producible power as accurately as possible, more accurately than is known in the prior art, in particular. It relates to determining an equivalent wind speed of a rotor blade plane of a wind power installation, which has a rotor with rotor blades that are adjustable in terms of their blade angle. The rotor blade plane, which can also be referred to as rotor plane, is the plane that is passed over by the rotor blades during the operation of the wind power installation. In so doing, a wind speed is determined that corresponds to a wind speed in which the wind acts uniformly and substantially perpendicular on the entire rotor blade plane. Here, this is referred to as an equivalent wind speed of the rotor blade plane.

To this end, an electric internal power available in the wind power installation is determined in a first step. This is a current power available at the respective instant as electric power, particularly in a DC link. This electric internal power available in the wind power installation, which is also simply referred to as internal power or available internal power below, is determined in this case depending on a captured electric power and a captured rotational speed of the rotor. In this respect, the captured electric power is not directly used as the electric internal power available in the wind power installation, but the available internal power is determined from the captured electric power and further taking account of the captured rotational speed of the rotor.

At least for simplifying illustration, the assumption can be made that the available internal power corresponds to the captured electric power in an ideal stationary state. In particular, the captured electric power preferably corresponds to the electric power fed into the DC link of an inverter if a full converter concept is present. Here, too, the available internal power corresponds to the available electric power, in relation to the DC link. In a stationary state assumed in an idealized manner, i.e., in the case of a constant rotational speed of the rotor in particular, these two powers may correspond to one another. In actual fact, such an idealized state is practically never present; at best, it could be occasionally assumed in a simplified manner. However, in reality, the wind speed, for all intents and purposes, varies without interruption and accordingly there is also a variation in the power that, in fact, would be available, i.e., the available internal power. This can be taken into account by way of the rotational speed, and, accordingly, the suggestion is to determine the available internal power depending on the captured electric power and the captured rotational speed of the rotor. Purely by way of precaution, reference is made to the fact that, in the case of a geared wind power installation, an appropriate conversion can be carried out from the rotational speed of the aerodynamic rotor to the rotational speed of the rotor of the generator. Then, which of the two rotational speeds is used is a question of the parameterization. In the case of using a modern ungeared wind power installation, such considerations can be dispensed with.

In any case, the equivalent wind speed then is determined depending on this determined available internal power and depending on the captured rotational speed. Consequently, the just-determined available internal power and the captured rotational speed are taken into account for this determination of the equivalent wind speed. Consequently, the rotational speed, in particular, is incorporated directly into this determination of the equivalent wind speed and this dependence of the captured rotational speed does not relate to an indirect dependence by virtue of the internal power already having been determined depending on the captured rotational speed. Thus, the captured rotational speed is taken into account once again for determining the equivalent wind speed.

Preferably, generator losses of the generator of the wind power installation are also taken into account to this end. In particular, such generator losses are added to the determined available internal power. Consequently, this sum corresponds to a generator input power. Expressed differently, the generator input power minus generator losses, i.e., minus generator loss powers, is determined when determining the available internal power. These generator losses are now added by computation in order to obtain this generator input power by computation. In addition to the generator losses, it is also possible to take account of further losses here, said further losses occurring during the conversion of aerodynamic energy into electric energy, in particular the electric energy in the form as present at the measurement site employed here. By way of example, these can be friction losses of the mechanical drive train including the gearing and electrical losses during the conversion from alternating current to direct current. In a modern, ungeared wind power installation, the latter losses are often negligible, however, and so reference continues to be made in a simplified manner to generator losses.

Moreover, or alternatively, at least one blade angle of a rotor blade is taken into account in this step of determining the equivalent wind speed. In the simple, generalized case, which is often sufficient, the rotor blades are adjusted synchronously, and so all rotor blades of the rotor have the same blade angle. Then, it is possible to use this one blade angle. If the blade angles of a plurality of rotor blades are adjusted individually, it is possible for taking account to be effected in such a way that an arithmetic mean of all blade angles is used in each case.

Then, in this step of determining the equivalent wind speed, it is possible to take account of the generator input power, i.e., the sum of available internal power and generator losses, the rotor rotational speed and the blade angle for determining the equivalent wind speed. The blade angle, in particular, also influences the amount of power that is removed or removable from the wind and therefore it is included in determining the equivalent wind speed. The blade angle is not relevant, according to one embodiment in any case, for determining the available internal power.

According to one embodiment, the proposition is that a power observer is used to determine the available internal power and, moreover or alternatively, a wind observer is used to determine the equivalent wind speed. Consequently, this power observer and this wind observer are state observers within the scope of control theory. Synonymously, they can also be referred to as a state observer for observing or estimating a power and a state observer for observing or estimating a wind speed, respectively.

Accordingly, particularly if both state observers are combined, the power observer observes the available internal power and outputs the latter as an input variable or, by the addition of the power loss, as a modified input variable to the wind observer, which finally outputs the equivalent wind speed as an output variable.

Preferably, the wind observer has three input variables, namely the determined available internal power plus captured or determined generator losses, the captured rotational speed and at least one blade angle. In addition to the equivalent wind speed, an available power is output as an output variable for the wind observer, wherein said available power should specifically arise in the case of an ideal blade angle and an ideal tip-speed ratio in the case of the captured equivalent wind speed. Finally, according to one embodiment, the proposition is also that the current tip-speed ratio is output as a third output variable. Consequently, the wind observer can establish these three output variables on the basis of three input variables. The tip-speed ratio, in particular, can provide additional information in this case for testing the results in respect of plausibility.

In particular, the use of the proposed state observers allows the respectively underlying system to be taken into account with high accuracy in a simple manner and, in particular, with little or no delays either.

With knowledge of the specified input and output variables, the respective state observers can be created and dimensioned by way of control-theory approaches that are known per se. An important aspect consists of the available internal power being determined by a first state observer, in particular, from the captured electric power and the captured rotational speed and of an input variable being formed together with the captured rotational speed for a second state observer, which then, in particular, determines the desired magnitude of the equivalent wind speed therefrom. The use of state observers is preferably proposed to this end, although this need not be the only solution to respectively determine the aforementioned output variables from the aforementioned input variables.

According to one embodiment, the proposition is that the wind power installation feeds into an electric power grid by means of an inverter having a DC link and the available internal power denotes the power available at the DC link. Thus, in particular, this is based on a full converter concept which has such a DC link. Preferably, the measured rotational speed of the rotor and the electric power fed into the DC link are the input variables for determining the available internal power. To the extent that a power observer is used, these two variables form the input variables of this power observer. Consequently, the electric power fed into the DC link is an input variable which is only used together with the measured rotational speed to determine the available internal power. In particular, the measured fed electric power is, in principle, improved as a result thereof to the extent that said electric power then is better suited to finally determining the equivalent wind speed.

According to one embodiment, a method is proposed, said method being characterized in that the, or a, power observer used for establishing the available internal power is defined by the structure:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

where
- J denotes the common moment of inertia of the rotor and generator,
- ω is the rotational speed of the generator,
- $k_\omega$ and $k_T$ are parameters for influencing the dynamics of the observer,
- $T_{el}$ is referred to as electric torque and calculated as the quotient of power $P_{DC}$ fed into a, or the, electrical temporary storage and the rotational speed w and
- $T_{mech}$ denotes the mechanical torque of the rotor and the generator, wherein the observed variables are denoted by a ^ sign, derivatives in time are denoted by a dot and the available power to be established is calculated as a product of the observed rotational speed $\hat{\omega}$ and observed mechanical torque $\hat{T}_{mech}$.

Consequently, this is a concrete specification of a state observer, namely the power observer, with which the available internal power can be determined, the latter also being particularly well suited to further use to determine the equivalent wind speed. It is possible to recognize that this concrete proposed power observer takes account of the corresponding dynamics of the wind power installation in a simple manner. Here, the rotational speed w of the generator can correspond to the rotational speed of the rotor if no gearing is present.

According to a further embodiment, the proposition is that a power that can be taken out of the wind overall and that is available to be fed into the electric power grid is established from the determined equivalent wind speed. Here, use is made of the fact that the equivalent wind speed that was determined according to the described embodiments has a comparatively high accuracy on account of the way of being determined and it is consequently possible to serve as a basis for determining a power that could be fed into the electric power grid if the installation were not subjected to throttling. Accordingly, this is preferably carried out when the wind power installation is operated in throttled operation. However, such a calculation of the feedable power preferably can also be undertaken when the wind power installation is not throttled. Then, the result should correspond to the actual currently fed power. Should general differences arise, i.e., for example, a recognizably systematic deviation, this could be used for compensating the method. This also applies to the established equivalent wind speed. As already described, the wind speed measured by a nacelle anemometer is subject to brief variations and not representative of the produced power of the wind power installation in the case of short temporal averaging. Particularly if the wind power installation is not throttled, the calculated equivalent wind speed allows a comparison with the measured wind speed, on the basis of which correction characteristics, for example, can be created.

According to the invention, a wind power installation is also proposed, said wind power installation having a rotor with rotor blades that are adjustable in terms of their blade angle and that pass over a rotor blade plane. The wind power installation is configured to capture an equivalent wind speed of the rotor blade plane and to this end comprises a power observation device and a wind observer device. The power observation device is configured to determine an electric internal power available in the wind power installation depending on a captured electric power and a captured rotational speed of the rotor. Consequently, the captured electric power and the captured rotational speed of the rotor are input variables of the power observation device, in particular. The wind observer device is configured to determine the equivalent wind speed depending on the determined internal power and the captured rotational speed. Consequently, the determined internal power and the captured rotational speed, in particular, each form an input variable for the wind observer device. Here, the determined internal power, in particular, can be incorporated as a modified variable, to which, specifically, generator losses still can be added initially. Alternatively, the wind observer device can provide, of its own accord, a modification such as the addition of the generator losses.

Preferably, a method as explained in conjunction with at least one of the embodiments described above is carried out in the wind power installation.

According to the invention, a wind farm is also proposed, said wind farm having at least two wind power installations according to at least one of the above-described embodiments. In this respect, a wind farm is the pooling of a plurality of wind power installations which, together, feed into the electric power grid via a common grid connection point. The particular advantage of the wind farm lies in the fact that it can also provide a high balancing power by way of the common feed of the power of a plurality of wind power installations. Accordingly, the wind farm can provide, for example, comparatively high balancing power according to the specifications of an operator of the electric power grid or depending on states of the electric power grid. Accordingly, there then also are great power differences between the actually fed power and the available power. Therefore, it is of particular importance here to determine the available power, or the difference between available power and fed power, as accurately as possible. The proposed determination of an equivalent wind speed can provide a good basis to this end.

In particular, the power to be fed overall into the electric power grid is calculated by summing the values calculated individually in each case by the wind power installations.

BRIEF DESCRIPTION OF THE SEVERAL VIEWS OF THE DRAWINGS

Now, the invention is explained in more detail in an exemplary manner on the basis of exemplary embodiments, with reference being made to the attached figures.

DETAILED DESCRIPTION

Figure 1:
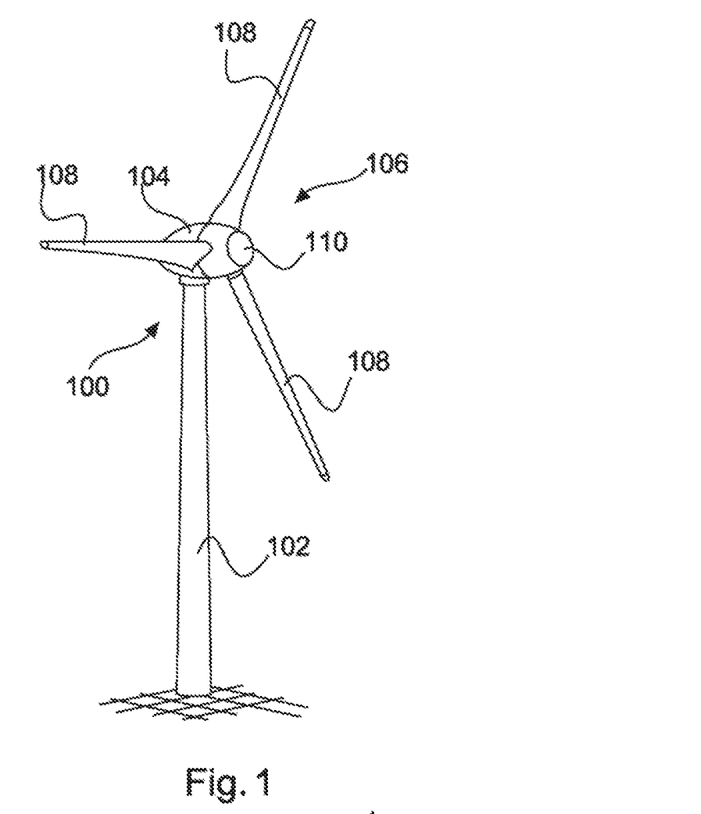
FIG. 1 schematically shows a wind power installation in a perspective illustration.

FIG. 1 shows a wind power installation 100 having a tower 102 and a nacelle 104. Arranged on the nacelle 104 there is a rotor 106 with three rotor blades 108 and a spinner 110. During operation, the rotor 106 is put into rotational movement by the wind and said rotor drives a generator in the nacelle 104 as a result thereof.

Figure 4:
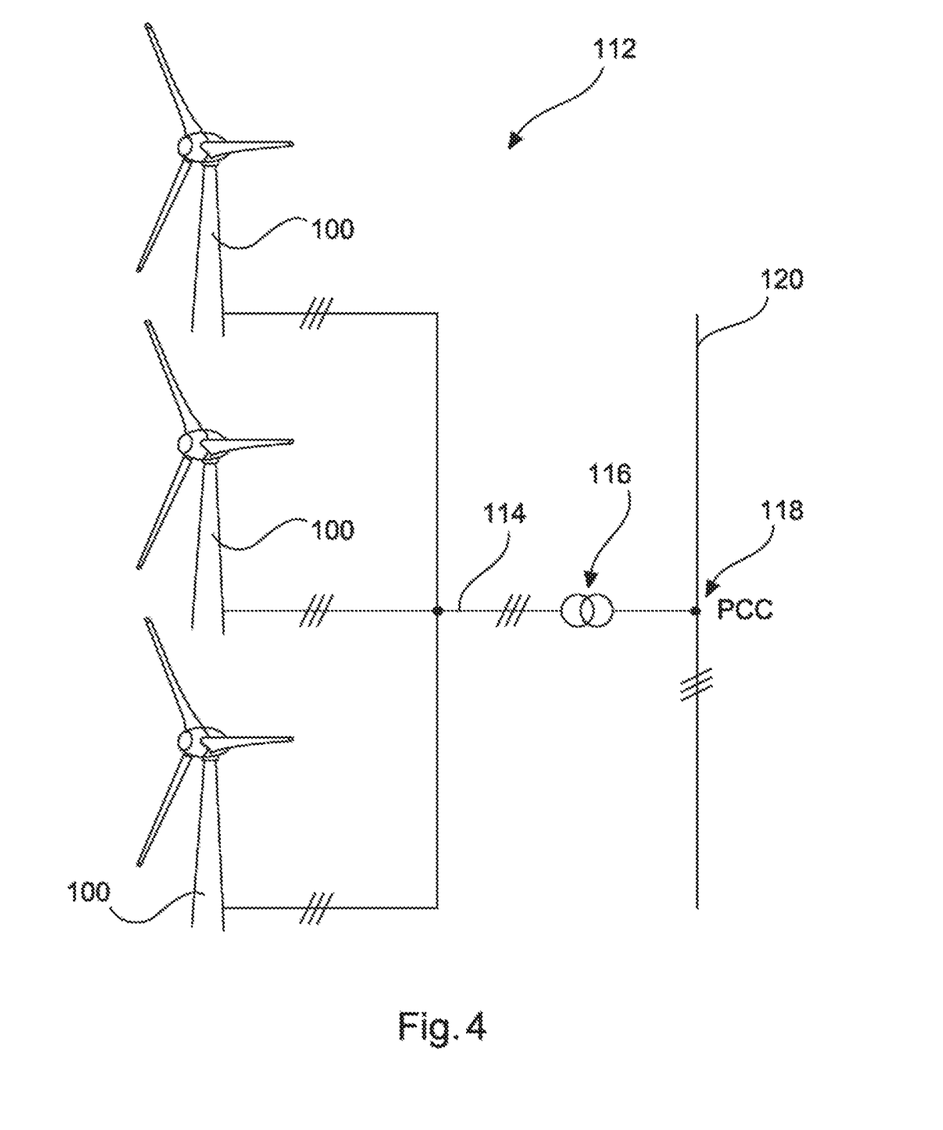
FIG. 4 schematically shows a wind farm.

FIG. 4 shows a wind farm 112 with three wind power installations 100, which may be the same or different, in an exemplary manner. Consequently, the three wind power installations 100 are representative of, in principle, any number of wind power installations of a wind farm 112. The wind power installations 100 provide their power, specifically the produced current, in particular, by means of an electric farm grid 114. Here, the currents and powers of the individual wind power installations 100 produced in each case are added and provision is usually made of a transformer 116, which steps up the voltage in the farm, in order then to feed said voltage at the feed point 118, which is generally also referred to as PCC, into the power grid 120. FIG. 4 is only a simplified representation of a wind farm 112 which, for example, does not show any controller, even though a controller is naturally present. Additionally, the farm grid 114, for example, can have a different design, by way of example by virtue of there being present a transformer at the output of each wind power installation 100, too, to cite just another exemplary embodiment.

The present invention relates to a method and a corresponding apparatus for determining the equivalent wind speed in the rotor blade plane of a wind power installation (WPI). In particular, this is carried out using measurement data relating to the electric power, rotational speed of the rotor and the blade angle according to one embodiment.

An embodiment described below is based on the use of two observers (or controllers within the meaning of control theory), which, together, facilitate a dynamic determination of the available maximum power and the effective wind speed that is as accurate as possible.

The main goal of the application of the proposed solution lies in calculating the available power, i.e., the power that a WPI could produce if it were not reduced or restricted in terms of its power as a result of external specifications. This can be used, inter alia, for offering negative (primary/secondary) balancing power, i.e., in particular, for curtailing a WPI in the case of overfrequency in an energy system. Particularly for calculating the available power, the accuracy of corresponding methods may play a decisive role.

In the non-power-reduced operation, which can also be referred to as unrestricted, a wind power installation produces power that depends on the current wind speed, which is exactly determined by a wind speed-power characteristic for each wind power installation type by way of measurements. If the wind speed is known accurately, the available power thus can be determined on the basis of this characteristic.

Accordingly, an option for determining the available power in each operating state would arise from measuring the wind speed using an anemometer that is typically installed on the nacelle of a wind power installation. However, such a measurement only has restricted use for the aforementioned application, even though it can be carried out very accurately using modern ultrasonic anemometers. Firstly, the anemometer only measures the wind speed at the center of the plane defined by the rotor blades. The wind speeds at the blade tips which, in current wind power installations, are at a distance of 50 m or more from the nacelle cannot be measured. Moreover, the measurement may be influenced by turbulence and shadowing as a result of the position of the anemometer downstream of the rotor blades. The measured values of a nacelle anemometer therefore only have a good correlation with the actual power values of a WPI in the case of averaging over long time intervals of 10 minutes and more. Therefore, they are not suitable for determining the currently available power, as may also be gathered from citation [1].

A second option consists in calculating the available power from the current wind power installation power (e.g., the power of a wind power installation with full converters, fed into the DC link) and the blade angle of the wind power installation. If a wind power installation is restricted in terms of its power to below the available power, it is necessary to reduce the supply of mechanical power. This can be brought about by increasing the blade angle. The reduction in the aerodynamic power coefficient $c_p(\lambda,\alpha)$ when increasing the blade angle $\alpha$ generally depends, in this case, on the tip-speed ratio $\lambda$.

Should a wind power installation now be operated continuously at the same tip-speed ratio, in particular at the ideal tip-speed ratio $\lambda_{opt}$, even in the case of varying wind speeds, by way of a known power or rotational speed regulation, a fixed power reduction emerges by increasing the blade angle in relation to a certain optimal blade angle $\alpha_{opt}$. If the power-reducing effect has been determined for each blade angle, it is possible to calculate the available power from the current WPI power $P_{act}$ and the power reduction coefficient $k(\alpha)=1-c_p(\lambda_{opt},\alpha)/c_p(\lambda_{opt},\alpha_{opt})$ according to the following formula:

$$P_{available} = \frac{P_{act}}{1-k(\alpha)}$$

However, a constant tip-speed ratio cannot be maintained under all operating conditions. There can be deviations from the optimum, particularly in the case of a strong curtailment. Here, small deviations in the assumed power reduction coefficient can lead to errors when calculating the available power, particularly in the case of a strong curtailment, on account of the inversely proportional relationship between power reduction coefficient and estimated available power.

An algorithm is now proposed to solve this, said algorithm being able to estimate the available power depending on the wind speed, and hence at all operating points of a WPI, as reliably as possible.

Figure 2:
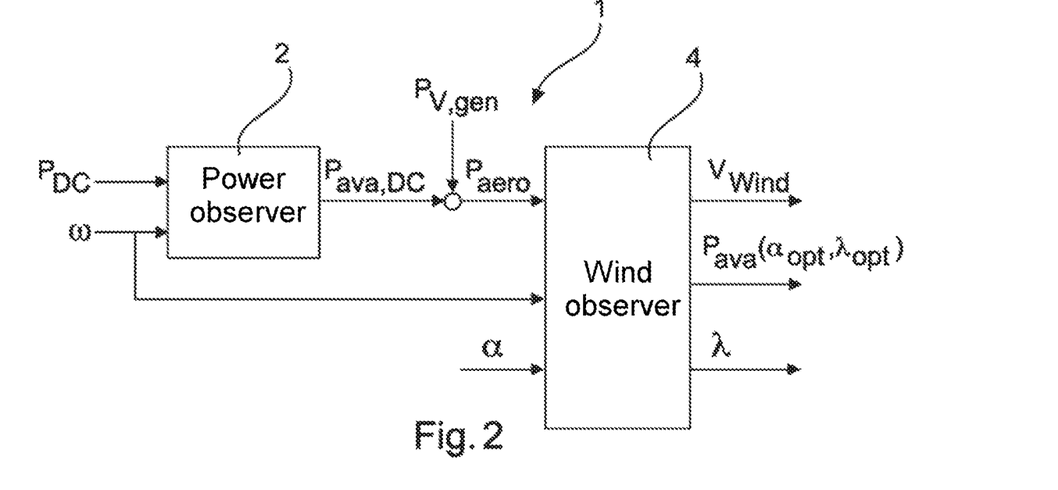
FIG. 2 shows a block diagram for explaining the algorithm that underlies the determination of the equivalent wind speed.

To this end, the method presented in FIG. 2 is proposed according to one embodiment. FIG. 2 consequently shows a block diagram 1 of a proposed algorithm, and hence of a proposed method, for determining an equivalent wind speed $V_{Wind}$.

Therein, use is made of two observers which, on the basis of specific measured variables, observe or estimate other, non-measurable values.

The power observer 2 illustrated in FIG. 2 determines the available internal power as power $P_{ava,DC}$ available at the DC link from the power $P_{DC}$ that is fed into, and measured at, the DC link and the rotor rotational speed $\omega$.

Consequently, the rotational speed (w) and power in the DC link ($P_{DC}$) variables are captured by measurement. Provided it is ungeared, the rotational speed ($\omega$) of the generator corresponds to the rotational speed of the rotor. From this, the available internal power $P_{ava,DC}$ is determined or calculated with the aid of the state observer 2, it also being possible to refer to said internal power as available aerodynamic power in relation to the link ($\hat{P}_{avaDC}$), i.e., it corresponds to the aerodynamic power minus the generator losses, and possibly minus further losses such as friction or current conversion losses.

The power observer can be based in the following, simplified system description, which can also be referred to as an acceleration equation of a rotating one-mass system:

$$J\dot{\omega} = T_{mech} - T_{el} = \frac{1}{\omega}(P_{mech} - P_{el})$$

In this formula, J denotes the moment of inertia of the rotating masses of the WPI, ω denotes the rotational speed of the WPI, $T_{mech}$ and $P_{mech}$ denote the torque and power, respectively, arising at the shaft due to the wind and $T_{el}/P_{el}$ denote the electromechanical torque and the power, respectively, of the generator. Here a dot once again denotes a derivative of a variable with respect to time. If a generator power that exceeds the mechanical power is taken out over a period of time, the WPI consequently decelerates.

For the power observer 2 and proceeding from the acceleration equation of a rotating one-mass system, above, it is possible to set up the following state space model of the wind power installation, having the state variables of rotational speed (ω) and mechanical torque ($T_{mech}$):

$$\begin{bmatrix} \dot{\omega} \\ \dot{T}_{mech} \end{bmatrix} = \begin{bmatrix} 1 & \frac{1}{J} \\ 0 & 0 \end{bmatrix} \begin{bmatrix} \omega \\ T_{mech} \end{bmatrix} + \begin{bmatrix} -\frac{1}{J} \\ 0 \end{bmatrix} T_{el}$$

Of the variables used here, it is not possible to measure the mechanical torque $T_{mech}$ and therefore the latter should be calculated from the measurement data by way of a state observer. Since, moreover, the rotational speed signal often is only measured with a low resolution and with a low sampling rate, a state observation is proposed for this value, too. A suitable observer structure can be formulated as follows, with reference being made to citation [4] for further explanations:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

Here, in contrast to the measured input variables of rotational speed ω and electric torque $$T_{el} = \frac{P_{DC}}{\omega},$$

denoted by ^. $P_{DC}$ is the electric power fed into the DC link. The two parameters $k_\omega$ and $k_T$ influence the dynamic behavior and, in the case of a time-discrete implementation, the stability of the state observer, too, and have to be chosen taking these aspects into account.

The aerodynamic power $\hat{P}_{avaDC}$ is calculated by way of the product of rotational speed and torque. Then, this corresponds to the determined available internal power $P_{ava,DC}$.

Input variables for determining the available internal power $P_{ava,DC}$ are the measured electric power $P_{DC}$ that is fed into the DC link and the measured wind power installation rotational speed ω. Then, the available electric power, in relation to the DC link, $P_{ava,DC}$, is the output value. This observer is important since the wind power installation, under certain circumstances, is not at a stationary operating point at which the power $P_{DC}$ corresponds to the currently available wind power, said wind power installation instead almost permanently accelerating or decelerating during normal operation and, for example, possibly deviating from a normal rotational speed-power characteristic for grid support, in which energy is taken from kinetic energy of the rotation.

The generator losses $P_{VGen}$ are added to the available internal power $P_{ava,DC}$ that is related to the DC link. These losses either can be determined in measurements during operation or can be gathered from a characteristic for the respective generator working point (optionally taking account of temperature measurement values). Additionally, if relevant, friction and current conversion losses can also be added thereto. The result of this addition is the available generator input power of the wind power installation, referred to in a simplifying manner as $P_{aero}$. For this calculation, the generator losses expected for the maximum available input power should be used instead of the current generator losses.

This power and the measured wind power installation rotational speed w and the current blade angle α are used as input values for the second observer, the wind observer 4. The latter observes the wind speed $V_{Wind}$ that leads to the available power at the current blade angle α. In principle, this relates to a solution v to the equation $$P_{aero} = \tfrac{1}{2}\rho A v^3 C_p(\lambda,\alpha),$$

where $P_{aero}$ is assumed as known from the power observer 2, ρ denotes the air density, A denotes the rotor area and $C_p(\lambda,\alpha)$ denotes the power coefficient depending on the tip-speed ratio λ and the blade angle α. This is a nonlinear equation, in which the wind speed v is included directly and indirectly via the tip-speed ratio $$\lambda = \frac{\omega R}{v}$$

(ω in turn denotes wind power installation rotational speed in rad/s and R denotes the radius of the aerodynamic rotor). Different solutions thereto are known from citation [2].

On account of the nonlinear properties of the equation, a nonlinear approach to determining the wind speed as the basis for the wind observer was found to be advantageous and reference is made in this respect to citations [2, 3], listed under the phrase immersion and invariance.

However, in contrast to citations [2] and [3], it is not the measured electric wind power installation power that is used as an input variable for the wind observer 4 in the solution proposed here, but instead the available internal power that is determined or calculated by way of the power observer 2. This is important for the correct, at least desired functionality of the wind observer 4 in the transient operation of the wind power installation (i.e., in the case of strong acceleration or deceleration, for example for grid support, in which energy is taken from kinetic energy of the rotation).

Preferably, the wind observer 4 also additionally outputs the available power Pava($\alpha_{opt}$, $\lambda_{opt}$) of the wind power installation. This is the power that could be produced by the wind power installation at the equivalent wind speed $V_{Wind}$, determined by the wind observer 4, if the ideal blade angle $\alpha_{opt}$ and the ideal tip-speed ratio $\lambda_{opt}$ were set. By way of example, this can be calculated on the basis of the equivalent wind speed $V_{Wind}$ and taking account of known relationships between wind and produced power at the specified conditions (optimal blade angle $\alpha_{opt}$ and optimal tip-speed ratio $\lambda_{opt}$). By way of example, an appropriate characteristic can be stored to this end. Additionally, it is proposed to output the current tip-speed ratio λ, which can be calculated from the wind speed, rotational speed and rotor diameter.

Figure 3:
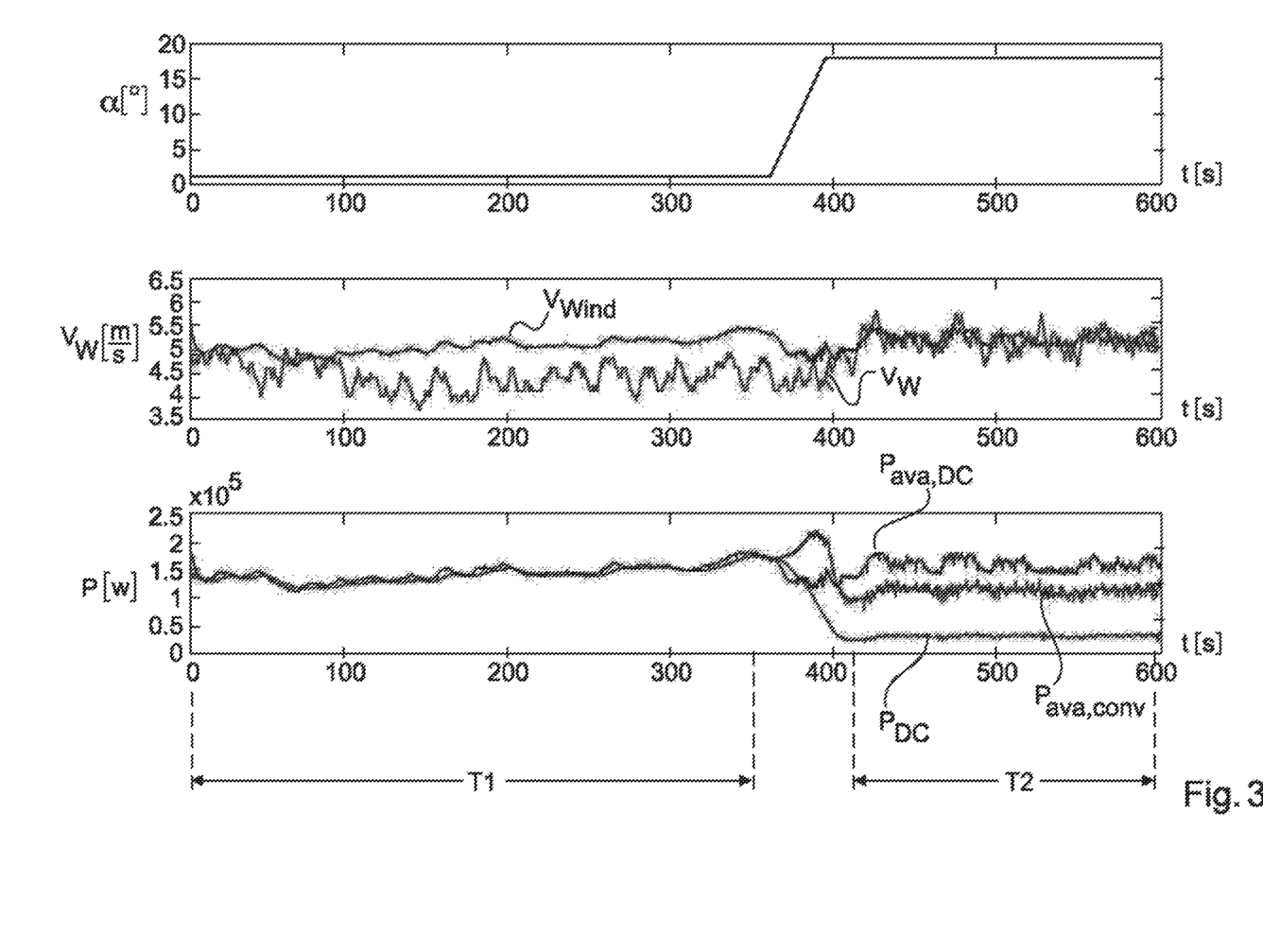
FIG. 3 shows diagrams for comparing the result according to one embodiment in comparison to a previous approach.

Results of the proposed power observer and wind observer are compared to a conventional calculation of the available power in FIG. 3. The basis for the results illustrated in FIG. 3 is formed by carrying out a measurement on a wind power installation of the Enercon E-70 E4 type, which is operated in the first 350 seconds of the examined measurement window with a constant 1° blade angle, and the blade angle is subsequently set to 17.5°. The wind speed $V_W$ and electric power $P_{DC}$ fed into the link were measured. The estimated wind speed $V_{Wind}$ is illustrated in the second graph and the estimated available internal power $P_{ava,DC}$, which was established on the basis of the wind observer 4, is plotted in the third graph. For comparison purposes, the available power $P_{ava,conv}$ captured using a conventional method is also illustrated in the third graph.

The proposed solution can be used for applications of positive and negative balancing energy with wind energy, both primary balancing energy and secondly balancing energy. Here, the improved accuracy, in particular, can be important. The solution can find use as a replacement for a second nacelle anemometer.

By correctly determining the wind speed, at least determining the latter with a high accuracy, it is possible to calculate the maximum available power of the wind power installation in many operating states. This allows the correct, at least relatively accurate, determination of, e.g., negative balancing power provided, where a wind power installation or a wind farm has to reduce its power by a certain value below the available power. Furthermore, the requirement for a second wind measuring appliance, for example for satisfying requirements directed at safety, may be solved by means of software instead of hardware.

The proposed solution is at least an improvement of previously known solutions. The core problem of determining the wind speed lies in solving the aerodynamic power equation:

$$P_{aero} = \tfrac{1}{2} \rho A v^3 C_p(\lambda, \alpha), \quad (1)$$

where ρ denotes the air density, A denotes the rotor area, which can synonymously also be referred to as rotor blade area, v denotes the wind speed and $C_p(\lambda,\alpha)$ denotes the power coefficient as a function of the tip-speed ratio λ and the blade angle α. Even though, strictly speaking, this equation denotes the mechanical power of the rotor at the generator rotor, it can be determined approximately from the measured electric power and the estimated or calculated generator losses and can therefore be assumed as known, albeit as a variable afflicted by noise. The difficulty in solving this equation for the unknown v lies in the twofold input of the variables in the equation, both directly ($v^3$) and via the tip-speed ratio $$\lambda = \frac{\omega_m R}{v}$$

($\omega_m$ once again denotes the wind power installation rotational speed in rad/s).

A numerically efficient and, at the same time, accurate solution according to citation [2] can be obtained by way of an observer according to the "immersion and invariance" principle, as shown in citation [3]. To this end, the following system of state equations is implemented:

$$\dot{\hat{v}}_w^I = \gamma\left[\frac{1}{J}\frac{P_{mech}}{\omega_m} - \Phi(\omega_m, \hat{v}_w^I + \gamma\omega_m)\right], \quad (2)$$

$$\hat{v}_w = \hat{v}_w^I + \gamma\omega_m, \quad (3)$$

where $$\Phi(\omega_m, v_w) = \frac{1}{2}\rho\frac{A}{J}\frac{v_w^3}{\omega_m}C_p\left(\frac{r\omega_m}{v_w}, \alpha\right),$$

J denotes the moment of inertia of the wind power installation rotor, $P_{mech}$ denotes the available DC power of the generator plus the generator losses, estimated by the power observer, γ>0 is an adjustable adaptation parameter of the filter, ρ denotes the air pressure, A denotes the rotor area and r denotes the rotor radius of the WPI. The derivative of the variable $\hat{v}_w^I$ with respect to time is denoted by a dot. The output values of the wind observer are calculated by the numerical solution of this system of state equations. Here, the variable $\hat{v}_w$ calculated in equation (3) forms the estimated wind speed $V_{Wind}$. The estimated tip-speed ratio λ then emerges from the measured rotational speed and the estimated wind speed according to the aforementioned equation. The available power emerges from the solution of equation (1) with taking account of losses arising in the wind power installation at the estimated ideal working point and of possible technical or operative restrictions, which may have a restriction of this available power as a consequence.

A decisive modification of the wind observer described here in relation to the solution described in citation [3] lies in the use of an available power, estimated by a separate observer, for the calculation of $\hat{v}_w^I$ (equation (2)). By contrast, the measured electric power or the electric torque is used directly in citation [3], under the assumption that the wind power installation in the partial load range is always operated near its ideal operating point. However, in practice, there is a significant deviation between the current electric power and the power achievable at the optimal operating point, or the power available in the wind, on account of acceleration and deceleration processes in the case of a variable wind speed and, in part, also as desired on account of certain requirements such as grid frequency support, in which energy is taken from the kinetic energy of the rotation, and so a separate determination of the available power is proposed prior to solving the aerodynamic power equation by way of the wind observer for the purposes of accurately determining the wind speed at all operating points.

A further deviation in relation to the solution presented in citation [3] consists of taking account of the current blade angle α when determining the power coefficient $C_p(\lambda,\alpha)$. This is of decisive importance for using the wind observer for determining the maximum possible power since the blade angle, as a rule, is greater than the ideal blade angle in the down-regulated operation of the wind power installation. Consequently, for determining the maximum available power, the wind speed estimated by the wind observer and the calculation of the power coefficient for this wind speed and the optimal blade angle $\alpha_{opt}$ and an optimal tip-speed ratio $\lambda_{opt}$, $C_p(\lambda_{opt}, \alpha_{opt})$, and the solution of the aerodynamic power equation (1) with the estimated wind speed and the optimal $C_p(\lambda_{opt}, \alpha_{opt})$ are advantageous.

Consequently, an improvement in the accuracy of determining the available power in the case of strong down-regulation is created.

Particular advantages of the proposed solution may consist in determining the available power at, where possible, all working points at which the wind power installation is in operation, taking account of operating states at which the wind power installation deviates from its stationary working point, inter alia when providing grid services, determining the equivalent wind speed in the rotor plane without additional sensor systems and, moreover, highly precisely determining the rotational speed and acceleration of the wind power installation in the case of an appropriate implementation.

CITATIONS

[1] K. E. Johnson, L. Y. Pao, M. J. Balas, L. J. Fingersh: Control of Variable-Speed Wind Turbines—Standard and Adaptive Techniques for Maximizing Energy Capture. IEEE Control Systems Magazine, June 2006, pages 70-81.

[2] M. N. Soltani, T. Knudsen, M. Svenstrup, R. Wisniewski, P. Brath, R. Ortega, K. Johnson: Estimation of Rotor Effective Wind Speed: A Comparison. IEEE Transactions on Control Systems Technology, 21 (4), July 2013, pages 1155-1167.

[3] R. Ortega, F. Macilla-David, F. Jaramillo: A Globally Convergent Wind Speed Estimator for Windmill Systems. In Proc. 2011 $50^{th}$ IEEE Conference on Decision and Control, Orlando, Fla., USA, December 2011, pages 6079-6084.

[4] C. M. Verrelli, A. Savoia, M. Mengoni, R. Marino, P. Tomei, L. Zarri: On-line Identification of Winding Resistances and Load Torque in Induction Machines. IEEE Transactions on Control Systems Technology, volume 22 (4), July 2014.

The invention claimed is:

1. A method for determining an equivalent wind speed of a rotor blade plane of a wind power installation having a rotor with a plurality of rotor blades that have adjustable blade angles, the method comprising:

determining an internal electric power available in the wind power installation based on a captured electric power and a captured rotational speed of the rotor; and determining the equivalent wind speed based on the determined available internal electric power and the captured rotational speed.

2. The method as claimed in claim 1, wherein determining the equivalent wind speed includes:

determining the equivalent wind speed based on at least one blade angle of a rotor blade of the plurality of rotor blades.

3. The method as claimed in claim 1, comprising:

determining, by a power observer, the available internal electric power; and determining, by a wind observer, the equivalent wind speed.

4. The method as claimed in claim 3, comprising:

obtaining, by the wind observer, the available internal electric power, captured or determined generator losses of the wind power installation, and the captured rotational speed; and receiving, by the wind observer, at least one blade angle as an input variable; and outputting, by the wind observer, the equivalent wind speed, an available power in a case of an ideal blade angle, and ideal tip-speed ratio, and a current tip-speed ratio as output variables.

5. The method as claimed in claim 1, comprising:

feeding, by an inverter of the wind power installation having a DC link, the available internal electric power into an electric power grid.

6. The method as claimed in claim 5, wherein the captured rotational speed of the rotor and electric power fed into the DC link are used as input variables for determining the available internal electric power or as input variables for a power observer.

7. The method as claimed in claim 1, wherein a power observer used for establishing the available internal electric power is defined by:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

where

J denotes a common moment of inertia of the rotor and a generator of the wind power installation, ω is a rotational speed of the generator, $k_\omega$ and $k_T$ are parameters for influencing dynamics of the power observer, $T_{el}$ is an electric torque represented by a quotient of an electric power fed into a temporary electrical storage and the rotational speed of the generator, and $T_{mech}$ denotes a mechanical torque of the rotor and the generator, wherein the observed variables are denoted by a ˆ sign, derivatives in time are denoted by a dot and available power to be established is determined as a product of an observed rotational speed ($\hat{\omega}$) and an observed mechanical torque ($\hat{T}_{mech}$).

8. The method as claimed in claim 1, comprising:

determining, based on the equivalent wind speed, an overall power that can produced from wind and that is available to be fed into an electric power grid.

9. The method as claimed in claim 1, wherein determining the equivalent wind speed includes:

determining the equivalent wind speed based on generator losses of a generator of the wind power installation.

10. The method as claimed in claim 1, wherein determining the equivalent wind speed includes:

determining the equivalent wind speed based on at least one of: friction losses of rotating parts of the wind power installation, or power conversion losses of one or more current converters of the wind power installation.

11. A wind power installation having a rotor with a plurality of rotor blades that have adjustable blade angles and that rotate in a rotor blade plane, comprising:

a power observation device configured to determine an internal electric power available in the wind power installation based on a captured electric power and a captured rotational speed of the rotor; and a wind observer device configured to determine an equivalent wind speed of the rotor blade plane based on the determined internal electric power and the captured rotational speed.

12. A wind farm having a plurality of wind power installations including the wind power installation as claimed in claim 11.

13. The wind power installation as claimed in claim 11, wherein an entire power to be fed into an electric power grid is determined by summing a plurality of internal electric power values available in a plurality of wind power installations, respectively.

14. The wind power installation as claimed in claim 11, wherein the wind observer device is configured to determine the equivalent wind speed based on at least one blade angle of a rotor blade of the plurality of rotor blades.

15. The wind power installation as claimed in claim 14, wherein the wind observer device is configured to:
- obtain the available internal electric power, captured or determined generator losses of the wind power installation, and the captured rotational speed; and
- receive the at least one blade angle as an input variable; and
- output the equivalent wind speed, an available power in a case of an ideal blade angle, and ideal tip-speed ratio, and a current tip-speed ratio as output variables.

16. The wind power installation as claimed in claim 14, comprising:
- an inverter having a DC link and configured to feed the available internal electric power into an electric power grid.

17. The wind power installation as claimed in claim 16, wherein the captured rotational speed of the rotor and electric power fed into the DC link are used as input variables for determining the available internal electric power or as input variables for the power observation device.

18. The wind power installation as claimed in claim 11, wherein the power observation device used for establishing the available internal electric power is defined by:

$$\begin{bmatrix} \dot{\hat{\omega}} \\ \dot{\hat{T}}_{mech} \end{bmatrix} = \begin{bmatrix} -k_\omega & \frac{1}{J} \\ -k_T & 0 \end{bmatrix} \begin{bmatrix} \hat{\omega} \\ \hat{T}_{mech} \end{bmatrix} + \begin{bmatrix} k_\omega & -\frac{1}{J} \\ k_T & 0 \end{bmatrix} \begin{bmatrix} \omega \\ T_{el} \end{bmatrix}$$

where

J denotes a common moment of inertia of the rotor and a generator of the wind power installation, ω is a rotational speed of the generator, $k_\omega$ and $k_T$ are parameters for influencing dynamics of the power observation device, $T_{el}$ is an electric torque represented by a quotient of an electric power fed into a temporary electrical storage and the rotational speed of the generator, and $T_{mech}$ denotes a mechanical torque of the rotor and the generator, wherein the observed variables are denoted by a ^ sign, derivatives in time are denoted by a dot and available power to be established is determined as a product of an observed rotational speed ($\hat{\omega}$) and an observed mechanical torque ($\hat{T}_{mech}$).

19. The wind power installation as claimed in claim 11, wherein an overall power that can produced from wind and that is available to be fed into an electric power grid is determined based on the equivalent wind speed.

* * * * *